Feb. 8, 1955 H. H. ALLEN ET AL 2,701,718

APPARATUS FOR MANIPULATING ENDLESS BANDS

Filed March 17, 1951

H·H·ALLEN
H·V·SOTHERS
INVENTORS

ATTORNEYS

United States Patent Office 2,701,718

Patented Feb. 8, 1955

2,701,718

APPARATUS FOR MANIPULATING ENDLESS BANDS

Henry Hans Allen and Hugh Valentine Sothers, London, England, assignors to British Celanese Limited, a corporation of Great Britain Application March 17, 1951, Serial No. 216,243

Claims priority, application Great Britain March 20, 1950

1 Claim. (Cl. 271—2.18)

Figure 1:
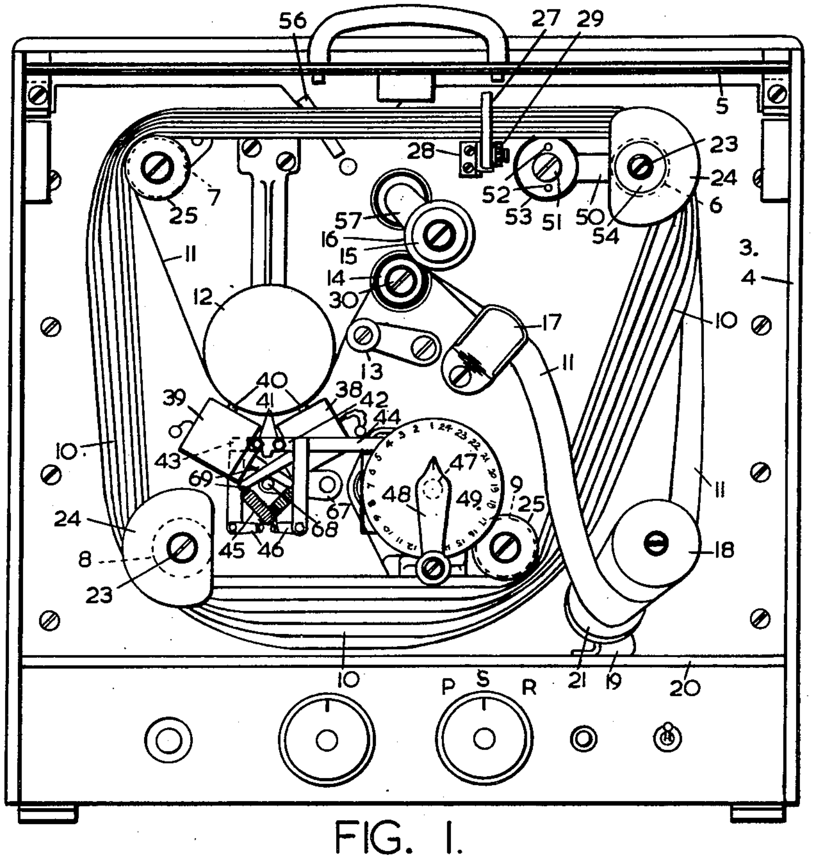

This invention relates to apparatus for manipulating an endless band and is, more particularly, concerned with apparatus employed for recording sound on an endless band.

One method of recording sound consists of forming a track modulated in accordance with the sound to be recorded on an endless band, the recording head used for producing the modulated track being slowly moved across the band so that by the time that part of the band where the track starts again reaches the head the head has moved sufficiently to permit continuation of the track to one side of the part of the track earlier formed. There have been numerous prior proposals in connection with such apparatus designed for forming a modulated track by producing an actual groove in the band by engraving or by embossing. The present invention is applicable to such apparatus but is in the main concerned with a form of apparatus which is useful where the method of recording involves the use of a band carrying a coating of magnetic material. Where the sound recording is effected by formation of a groove in the band, slight movement of the band at the recording point is not of very great moment so long as the movement is not so great that successive tracks run into one another. With magnetic recording the tracks provide no guide themselves to the head used for reproducing a recording in the manner in which a groove guides the stylus in a pick-up. It is therefore of great importance that the position of the tracks in magnetic recording should be controlled with very great accuracy, so that in reproduction the reproducing head always follows closely the track which it is desired to follow.

According to the invention, apparatus for recording sound on an endless band in the form of a hollow coil with a loop extending from the innermost to the outermost convolution comprises a plurality of support rollers arranged to be embraced by and to carry said coil in a vertical plane, a recording roller, a drive roller and a pad roller, all situated within the zone encompassed by the coil on said support rollers and arranged so that a portion of the loop of such a coil passing in succession round said recording roller and drive roller and held in driving engagement with said drive roller by said pad roller assumes a position in which its edges are in the same planes as the edges of the band in the coil, and means for rotating said drive roller at a uniform speed.

In such an apparatus it is, of course, necessary to provide guide members to ensure that the coil once placed on the support rollers stays there, and it has been found in practice that the action of these guide members can, in fact, provide sufficient guiding for the whole band, so that it runs quite steadily round the recording roller with substantially no tendency to move from side to side. It is, therefore, unnecessary to provide additional guiding means at the recording roller.

The guide members of the coil may conveniently be in the form of flanges on the support rollers or fixed guides in the neighbourhood of the support rollers. Preferably the support roller from which the band passes to the recording roller is provided with a narrow flange on each side deep enough to accommodate several layers of the band, e. g. 5 to 15 layers. The distance between the inner faces of the flanges should be very little more than the width of the band. Generally a clearance of 0.1 to 0.3 mm. is sufficient and gives excellent results with a band of 35 mm. width. One or more of the remaining support rollers may be fitted on each side with fixed flange-like plates, positioned so as to permit a small amount of freedom of movement of the convolutions of the coil carried by the rollers, and wide enough to accommodate and guide all the convolutions of the coil. Fixed guides are preferred to rotating flanges of such diameter as to provide a channel deep enough to accommodate all the band layers, because it is found in practice that the use of such deep flanges leads to noisy operation of the apparatus.

Apparatus of the type described operates very effectively with a band the ends of which have been twisted with respect to each other through 180° before being joined. As is well known, with such a band the recorded track is formed on both sides of the band. Where the magnetic method of recording is employed, however, it is generally more satisfactory to record only on one side of the band.

It has been found advantageous, and particularly so when recording is effected on one side only of the band, to provide an additional roller outside the zone encompassed by a coil on the support rollers, and to use this additional roller for supporting part of the loop referred to so as to prevent this loop becoming so short during the operation of the apparatus that it is drawn taut from the inside to the outside of the coil.

Figure 2:
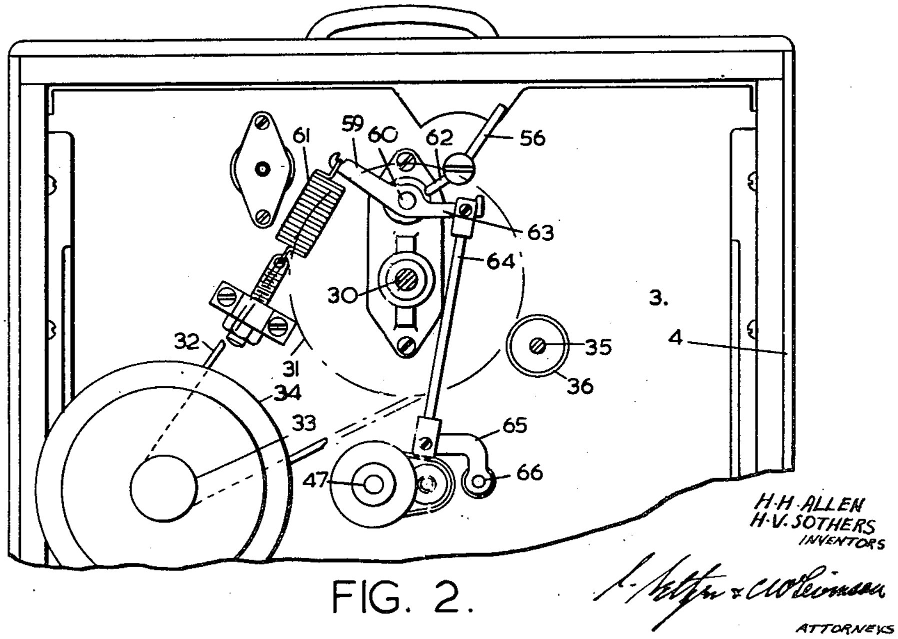

By way of example one form of magnetic recording apparatus in accordance with the present invention will now be described in greater detail with reference to the accompanying drawings in which, Figure 1 is a front elevation of the apparatus, and Figure 2 is a detail view of the rear of the panel on which the principal elements of the apparatus are mounted.

In the drawings the panel is shown at 3 and is surrounded by a casing 4 and provided with a cover 5 which can be drawn out from the position in which it is shown and swung down to enclose the mechanism mounted on the panel. The mechanism comprises four support rollers 6, 7, 8, 9 for carrying an endless band in the form of a hollow coil 10 of 35 mm. film which has a loop 11 extending from the innermost to the outermost convolution of the coil. The film is provided on its outer face with a coating of magnetic material for receiving the recording. The loop 11 after leaving the support roller 7 passes beneath a recording roller 12, past a flanged guide roller 13 and round a drive roller 14 against which it is pressed by a pad roller 15. The pad roller 15 is covered with a thick layer of soft rubber 16 vulcanised to its surface, which layer presses against the surface of the drive roller 14. The surface of the roller 14 is lightly knurled or roughened to prevent slip relatively to the band, or may be covered with a thin layer of hard rubber. From the roller 14 the loop 11 passes over a guide member 17 projecting obliquely from the front of the panel 3 and thence to a conical roller 18 mounted on a bracket 19 over the base 20 of the apparatus. The roller 18 is inclined at an angle of 40°–50°, both vertically and horizontally, to the axes of rotation of the support rollers 6–9, with its widest diameter furthest from the coil 10. The lower and smaller end of the roller 18 is furnished with a narrow flange 21. From the roller 18 the loop 11 passes upwards to the support roller 6, where it rejoins the coil 10 as the outermost convolution thereof.

The spindles 23 of the rollers 6 and 8 carry pairs of fixed flange-like plates 24, which do not rotate with the rollers 6, 8 but are wide enough to accommodate and guide all the convolutions of the coil 10 to and from the rollers, each pair of plates 24 being spaced apart by a distance exceeding by a small clearance the width of the band in the coil. The rollers 7, 9 on the other hand themselves carry narrow flanges 25 of sufficient width to accommodate a few of the innermost convolutions of the coil 10. On its way from the roller 6 to the roller 7 the coil pases through a guide collar 27 which permanently surrounds the coil and is removed with it from the apparatus. The collar 27 is secured to a bracket 28 extending from the panel 3 by means of a knurled nut 29.

The recording roller 12 is of substantial construction so that there is no tendency for it to distort in use and so that its fly-wheel effect may eliminate slight fluctuations in the drive of the film, which is effected by driving the roller 14. The spindle 30 of the roller 14 extends through the panel 3 and, as indicated in Figure 2, carries a large pulley 31 driven by a band 32 from a pulley 33 on the shaft of a driving motor 34. The roller 12 is mounted on a spindle 35 (Figure 2) of substantial diameter carried in a long bearing 36 of porous oil-impregnated metal, or a well spaced pair of such bearings, to minimise play therein.

Beneath the recording roller 12, as shown in Figure 1, is a recording and reproducing head 38 and an erase head 39, each of which has a pair of pole pieces 40 which are pressed against the surface of the band loop 11 as it passes round the recording roller 12. The recording and erase heads 38, 39 are each pivoted on needle-point bearings 41 extending through the limbs 42, 43 of a forked bracket 44 and are urged into engagement with the band passing round the roller 12 by means of springs 45 connected to extensions 46 of the two limbs 41, 43. The bracket 44 is driven by a lead screw 47 (Figure 2) in a direction parallel to the axis of the roller 12. The lead screw 47 is steadily driven by any convenient means (not shown). In addition, a handle 48 enables the lead screw 47 to be rotated so as to adjust the lateral position of the bracket 44 and the heads 38, 39. A numbered disc 49 geared to the lead screw 47 indicates the revolutions performed thereby, and so shows the position of the heads 38, 39 across the width of the band at the recording roller 12.

The guide roller 6 is mounted on an arm 50 pivoted on a spindle 51 but held in position by means of pins 52 extending into a boss 53 on the panel 3. The arm is urged against the panel so as to ensure the engagement of the pins 52 by a spring (not shown) beneath the head of the spindle 51. A knob 54 enables the roller 6 and arm 50 to be pulled out against the action of this spring so that the arm can be swung downwards in order to facilitate the application or removal of a coil. For the same purpose a lever 56 is provided by means of which the pad roller 15, mounted on an arm 57 can be raised from the driving roller 14, and the heads 38, 39 can be lowered away from the recording roller 12. This is done, as shown in Figure 2, through a lever 59 mounted on the axis 60 of the arm 57 and loaded by means of a spring 61 which normally urges the pad roller 15 into engagement with the driving roller 14. A tail 62 on the lever 56, however, engages the other arm 63 of the lever 59 so as to raise the pad roller 15. The arm 63 is connected by a rod 64 to a lever 65 whose spindle 66 extends to the front of the panel 3 and, as shown in Figure 1, carries a lever 67 from the end of which extends a rod 68 passing beneath the two arms 69 to which the springs 45 are attached. Rotation of the lever 56 to raise the pad roller 15, therefore, raises also the lever 67 and so, through the rod 68 swings the recording and erase heads 38, 39 from the recording roller 12. This enables the coil 10 to be changed.

It will be seen that the coil 10 is conveniently disposed surrounding the assembly of the essential parts 12, 14, 15, 38 and 39 of the recording apparatus, and that the loop 11 on which, at any moment, the operation of recording or reproducing are being carried out, can be drawn directly and without distortion from the innermost convolution of the coil 10, its edges remaining co-planar with the edges of the coil itself until the loop 11 has passed the drive roller 14. The loop can then be guided out of the coil 10 by way of the guide 17 and conical roller 18, and returns to the outside of the coil.

Having described our invention, what we desire to secure by Letters Patent is:

Apparatus for the recording of sound on an endless band in the form of a hollow coil with a loop extending from the innermost to the outermost convolution, said apparatus comprising a plurality of horizontal support rollers arranged to be embraced by and to carry said coil in a vertical plane, fixed flange-like plates on each side of at least one of said support rollers, said plates being wide enough to accommodate and guide all the convolutions of said coil, a recording roller, a recording head co-operating therewith, a drive roller and a pad roller, all four situated within the zone encompassed by the coil on said support rollers and arranged so that a portion of the loop of such a coil passing in succession round said recording roller and drive roller and held in driving engagement with said drive roller by said pad roller assumes a position in which its edges are in the same vertical planes as the edges of the band in the coil, a narrow flange on each side of at least the support roller from which the band passes to said recording roller, for guiding the innermost convolutions of the coil, a conical roller additional to said support rollers, disposed outside the zone encompassed by the coil on said support rollers and outside the vertical planes occupied by the edges of the band in the coil, for guiding said loop, said conical roller having a narrow flange at its smaller end and being freely rotatable upon an axis inclined at an angle both horizontally and vertically to the axes of rotation of said support rollers with its widest diameter furthest from the coil, means for rotating said drive roller at a uniform speed, a mounting for one of said support rollers adapted to be movable inwards in relation to the coil, and means operatively connected to said pad roller and said recording head for simultaneously raising said pad roller from said drive roller and withdrawing said recording head from said recording roller to free said band to facilitate changing of the coil.

References Cited in the file of this patent

UNITED STATES PATENTS

| | | |
|---|---|---|
| 2,031,079 | Streyckmans | Feb. 18, 1936 |
| 2,120,724 | Williams | June 14, 1938 |
| 2,132,089 | Mihaly | Oct. 4, 1938 |
| 2,167,817 | Smith | Aug. 1, 1939 |
| 2,206,134 | Streyckmans | July 2, 1940 |
| 2,285,070 | Weber | June 2, 1942 |
| 2,290,082 | Wandel | July 14, 1942 |
| 2,318,316 | Lawrence | May 4, 1943 |
| 2,349,122 | Streeter | May 16, 1944 |
| 2,526,377 | London | Oct. 17, 1950 |
| 2,586,666 | Kuhlik | Feb. 19, 1952 |